Figure 1:
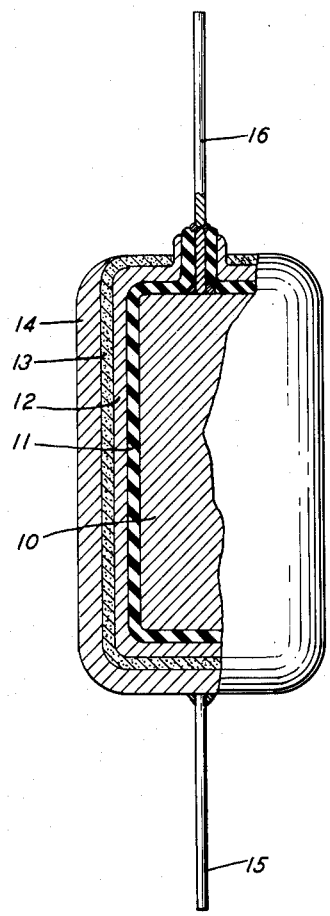

Dec. 14, 1965  F. N. FUSS  3,222,751
PREANODIZATION OF TANTALUM ELECTRODES
Filed May 23, 1960

INVENTOR
F. N. FUSS
BY
ATTORNEY

United States Patent Office 3,222,751
Patented Dec. 14, 1965

3,222,751
PREANODIZATION OF TANTALUM
ELECTRODES
Fred N. Fuss, Plaistow, N.H., assignor to Bell Telephone Laboratories, Incorporated, New York, N.Y., a corporation of New York
Filed May 23, 1960, Ser. No. 31,125
2 Claims. (Cl. 29—25.31)

This invention relates to a method for the fabrication of tantalum electrolytic capacitors utilizing a tantalum body as one of the electrodes, an oxide layer of the tantalum produced by anodization as the dielectric and an electrically conductive counter-electrode, and also relates to capacitors produced by such methods.

In one specific embodiment, this invention relates to a method for removing inpurities contained on the surface of dense tantalum bodies which have been mechanically worked and are destined for use as electrodes in solid electrolytic capacitors and to be capacitors so produced.

In the preparation of tantalum electrolytic capacitors, it is necessary to remove surface impurities from the stock which is destined for use as an electrode in order to produce a dielectric oxide film of the required characteristics. Tantalum electrodes which are to be used for such purposes are generally prepared by powder metallurgical techniques. The tantalum powders employed may contain a variety of impurities which may be introduced by reduction reagents, equipment surfaces, or are inherently present in the tantalum being reduced. These impurities may be metallic in nature, such as calcium, copper, iron, tin, aluminum, niobium; or nonmetallic, such as carbon and silicon. Very often these impurities are present in amounts sufficient to adversely affect to the quality of the resultant capacitors. Of these, capacitor properties are very sensitive to carbon.

In the case of porous tantalum electrodes, most of these impurities are removed by sintering in vacuum a suitably shaped "green" electrode element which is obtained by pressing tantalum powder together with a small amount, on the order of 1 to 2 percent by weight, of a finely divided metal oxide and a small amount, in the order of 1 percent by weight, of a binder, such as a polyethylene glycol compound, which are selected to facilitate pressing and to enter into chemical reactions with the impurities present.

Tantalum electrode elements, other than of the porous type, are generally obtained from sintered bars prepared by powder metallurgical techniques or from arc melted ingots which are subsequently shaped into the desired forms by fabricating methods such as forging, rolling and drawing. The impurity concentration in these dense forms is generally lower than in porous bodies due to the high temperatures employed in the sintering or arc melting process. However, the concentration of surface impurities in the dense bodies is usually higher than in porous forms due to embedment of contaminants, such as lubricants, coolants and abrasives, introduced during mechanical working. Consequently, dense tantalum bodies, such as foils and wires, are frequently rendered incapable of forming a dielectric oxide film of the required characteristics.

Heretofore, it has been the practice to clean the surface of dense tantalum bodies by means of a solvent extraction or etching technique wherein a material such as hydrogen fluoride has been employed as the etchant. These techniques have not proven to be completely acceptable and in many instances it has not been possible to form a dielectric oxide film because the electrolytic cell current would pass through the remaining impurity areas rather than form an oxide coating. As a result the fabrication of tantalum electrolytic capacitors from a solid stock has frequently been associated with low manufacturing yields due to high D.C. leakage currents.

In accordance with the present invention, there is produced from a mechanically worked body electrolytic capacitors utilizing tantalum anodes which possess electrical characteristics which are superior to those heretofore prepared. It has been discovered that the deleterious effects of surface impurities can be substantially eliminated by anodically depositing a thin film of tantalum pentoxide on the tantalum body and heating in vacuum at a temperature of the order of 2000° C. prior to anodization. The oxide film being in intimate contact with the surface to be cleaned provides the requisite amount of oxygen for reaction with the carbon during the vacuum heating step and facilitates carbon removal in the form of carbon oxides without leaving excess oxygen on the wire. For convenience, the term preanodization has been used in the specification to denote the step in which the deleterious surface impurities are removed.

The novel cleaning procedure as discussed herein has been found to have a profound effect upon filming characteristics, D.C. leakage currents and manufacturing yields.

Figure 2:
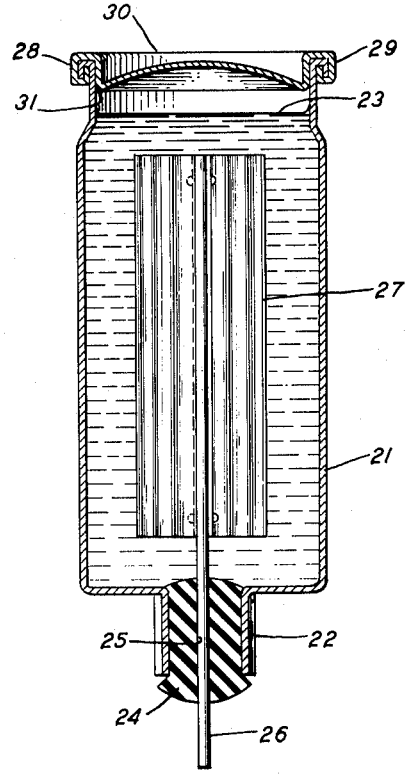

This invention will be more fully understood from the following detailed description when taken in conjunction with the accompanying drawing:

FIGURE 1 is a perspective view, partly in section, of a solid tantalum electrolytic capacitor; and FIGURE 2 is a diagram of a wet tantalum electrolytic capacitor.

With further reference to FIG. 1 there is depicted a solid electrolytic capacitor of the type to which the present invention is directed. Anode 10 is a dense tantalum body obtained from a sintered bar made by powder metallurgical methods. In intimate contact with anode 10 is oxide film 11 produced by anodization. Covering oxide film 11 is a film of manganese dioxide 12 produced by pyrolysis of an aqueous solution of manganous nitrite. Graphite layers 13 and solder shell 14 complete the capacitor. Electrode 15 is attached to shell 14 by schooping. Electrode 16 is an integral part of anode 10.

An electrolytic capacitor of the so called wet type using an anode formed in accordance with the present invention is shown in FIG. 2.

The container 21 is preferably of metal and constitutes the cathode of the capacitor. It may be either of filming or non-filming metal. The container is provided with a reduced tubular extension 22. A liquid electrolyte 23 is provided in the container, for example, an aqueous solution of a weak acid such as boric acid, phosphoric acid, citric acid etc. A seal provided in the extension 22 may consist of a plug 24 of rubber or other resilient material through the central bore 25, of which protudes an extension 26 of the anode 27. The extension 22 is crimped around the rubber plug to form a liquid and gas tight seal therewith. The anode 27 consists of a dense tantalum body obtained from a sintered bar made by powder metallurgical methods. At its free end the container is provided with a rim 28 around which is spun the edge 29 of the cap 30 with the interposition of a gasket vent 31 of a material sufficiently porous to permit the escape of gases liberated in operation.

The above electrode and capacitor structures are given merely as illustrations and any suitable construction of either wet or dry capacitors may be used.

For illustrative purposes, the present invention is described below in terms of the fabrication of solid electroylitic capacitors using a wound wire. However it is to be appreciated that the present invention is applicable to the manufacture of dense tantalum anodes regardless of the capacitor configuration.

One illustration of the process of this invention is in the fabrication of a solid electrolytic capacitor employing a wound wire tantalum anode. A high purity tantalum wire, for example, a ⅝ inch length of 20 mils diameter, is wound into an open helix. This helix is made by winding the wire about itself to form windings spaced at intervals of approximately 25 mils.

The wound wire is treated with an etchant, for example, consisting of one part hydrogen fluoride, one part nitric acid and two parts of water to remove gross impurities such as grease and soluble materials which may be present on its surface.

The next step in the process consists of anodizing the would helix in an electrolytic cell in which the helix is made the anode and a tantalum sheet is used as the cathode. The electrolyte employed is an aqueous solution of 0.4 percent of nitric acid. An anodizing voltage of the order of 50–200 volts D.C. is applied initially and maintained for approximately one to five hours. It has been found that anodization for less than one hour produces an oxide film which is not of uniform thickness and may be porous. Application of anodizing voltages for more than five hours changes the structure of the oxide film from amorphous to a crystalline form which is possessed of poor dielectric properties. The thickness of the tantalum pentoxide film is directly proportional to the voltage applied during the anodizing step and it has been found that the preferred thickness is of the order of 1000 to 3000 Angstroms (produced by a voltage of the order of 60 to 175 volts). It is preferred to employ an anodizing voltage of 100 volts which results in an oxide film of approximately 1,700 Angstroms in thickness.

The wire is next heated in vacuum at a temperature in the range of 1700° to 2600° C. for a time period of the order of 30 to 60 minutes, the upper limit being occasioned by the melting point of tantalum. The velocity of the reaction between the carbon and oxygen is increased with higher temperatures. Preferably the temperature is within the range of 2000° to 2200° C. due to apparatus limitations.

Following the above cleaning step, the wire is anodized in the customary manner. For example, an electrolyte which may be used is an aqueous solution containing 0.4 percent by weight of nitric acid. The anodizing voltage is applied and is maintained for approximately one to five hours.

The anodized body is then coated with a layer of manganese dioxide formed by a pyrolysis step. The anode is immersed into an aqueous solution containing in excess of 50 percent by weight of manganous nitrate and then heated in air to a temperature in the range of from 200° to 400° C. for periods ranging from 90 seconds to 300 seconds for the lower temperature and from 10 seconds to 80 seconds for the higher temperature. This step is repeated as often as three times in succession to obtain a total of up to four coats of manganese dioxide.

Following the pyrolysis, the coated anode may be reanodized in a manner similar to the initial anodization, in an electrolyte which may consist of an aqueous solution of acetic acid. A reanodizing voltage equal to the anodizing voltage is applied and maintained for 15 to 60 minutes.

The final steps in the fabrication of the capacitor consist of coating the manganese dioxide with an aqueous slurry of graphite, drying the graphite coating and depositing a soft solder casing over the graphite.

It is to be understood that the procedure outlined above is given for illustrative purposes only and not for purposes of limitation. A number of variations may be made, for example, the electrolyte employed in the preanodization may be any of the anodization electrolytes well known to those skilled in the art. Furthermore, the anodization and reanodization steps may employ any of the conventional prior art electrolytes.

The effect of the cleaning procedure of this invention is reffected in the data shown in table. Examples 1 through 6 represent capacitors fabricated in accordance with conventional prior art techniques.

EXAMPLES 1–6

Six coiled tantalum wires having an average diameter of 20 mils were etched with a solution consisting of one part hydrogen fluoride, one part nitric acid, and two parts water. The wires were next heat treated at 2100° C. for 45 minutes at a pressure of $10^{-4}$ millimeters of mercury. Following this treatment, an anodizing voltage of 100 volts D.C. was applied and maintained for 3 hours. The electrolyte employed was an 0.4 percent nitric acid solution. The anodized bodies were then coated with a layer of manganese dioxide formed in situ in a pyrolysis step. The anodes were immersed into an aqueous solution containing in excess of 50 percent by weight of manganous nitrate, and heated in air to a temperature of 250° C. for a time period of approximately 3 minutes. Following the pyrolysis, the anodes were reanodized at a voltage of 100 volts D.C. for 30 minutes at a current density of .035 milliampere in an 80 percent acetic acid electrolyte. The capacitors were completed by coating the manganese dioxide with an aqueous slurry of graphite, drying the graphite coating and applying a solderable silver coating over the graphite.

Examples 7–14 represent capacitors fabricated in accordance with the present invention.

EXAMPLES 7–14

Eight coiled tantalum wires having an average diameter of 20 mils were etched with a solution consisting of one part hydrogen fluoride, one part nitric acid and two parts of water. The wires were next anodized in a 0.4 percent nitric acid solution at a temperature of 65° C. for one hour at an anodizing voltage of 100 volts D.C. Following this treatment, the anodized bodies were heat treated at a temperature of 2100° C. for 45 minutes at a pressure of $10^{-4}$ millimeters of mercury. The wires were then anodized, reanodized, and fabricated into capacitors according to the procedure employed in Examples 1–6.

The table illustrates the effect of the above described preanodizing step on the electrical characteristics of solid tantalum capacitors and by comparing Examples 1–6 with 7–14 the beneficial effect of the novel process on electrical properties can be seen.

*Table*

| Example | Capacitance (microfarads) | Effective series resistance (ohms) | Leakage at 35 volts D.C. (microamps) | Leakage at 65 volts D.C. (microamps) |
| --- | --- | --- | --- | --- |
| 1 | 0.0313 | 109 | 0.0096 | 0.520 |
| 2 | 0.0303 | 115 | 0.0036 | 0.041 |
| 3 | 0.0331 | 91  | 0.0018 | 0.280 |
| 4 | 0.0315 | 88  | 0.071  | 7.500 |
| 5 | 0.0322 | 104 | 0.0047 | 0.290 |
| 6 | 0.0357 | 103 | 1.200  | 8.500 |
| PRETREATED ANODES | | | | |
| 7  | 0.0398 | 39 | 0.000080 | 0.0018 |
| 8  | 0.0407 | 33 | 0.000055 | 0.0025 |
| 9  | 0.0406 | 42 | 0.000075 | 0.0041 |
| 10 | 0.0399 | 40 | 0.000045 | 0.0026 |
| 11 | 0.0391 | 39 | 0.000065 | 0.0085 |
| 12 | 0.0439 | 37 | 0.000018 | 0.00080 |
| 13 | 0.0389 | 41 | 0.0024   | 0.054 |
| 14 | 0.0403 | 39 | 0.000035 | 0.00067 |

As indicated by the table, the above-described cleaning procedure has a beneficial effect on capacitance, effective series resistance and leakage current.

For the purpose of producing capacitors which are acceptable for commercial use and possess superior electrical characteristics it is convenient to compute yield figures. The yield of capacitors made from the wire anodes can be expressed as the percentage of completed units having D.C. leakage currents of not more than 25 microamperes when measured at 80 percent of the anodizing voltage.

EXAMPLE 15

Two samples of capacitors were prepared, each consisting of 45 units. The wire used in both samples was subjected to a heating treatment at 2100° C. prior to anodization but only one group of units was preanodized to a film thickness of 1350 Angstroms prior to the heating step. The preanodization treatment was identical to that of Examples 7-14. For the two samples, the yield of untreated units was 6.7 percent as compared with a yield of 71 percent for the preanodized units.

It will be appreciated by those skilled in the art that the present invention may be applied in the fabrication of solid and wet electrolytic capacitors where a mechanically worked tantalum body is employed as the anode. However, porous tantalum bodies do not come within the scope of the present invention as the impurities introduced by mechanical working are not encountered in such structures.

While the invention has been described in detail in the foregoing description and drawing, the aforesaid is by way of illustration only and is not restrictive in character. The several modifications which will readily suggest themselves to persons skilled in the art, are all considered within the broad scope of this invention, reference being had to the appended claims.

What is claimed is:

1. In the method of fabricating a tantalum solid electrolytic capacitor comprising the steps of anodizing a mechanically worked dense tantalum body, coating said dense tantalum body with a semiconductive layer and depositing a counter-electrode upon and in intimate contact with said semiconductive layer, the improvement which comprises anodically depositing a film of tantalum pentoxide of a thickness in the range of 1000 to 3000 Angstroms on said dense tantalum body and heating in vacuum at a pressure of the order of $10^{-4}$ mm. of mercury at a temperature of the order of 1700° to 2600° C. for a time period ranging from 30-60 minutes prior to anodizing.

2. The procedure in accordance with claim 1 in which the temperature of vacuum heating is in the range of 2000° to 2200° C.

References Cited by the Examiner

UNITED STATES PATENTS

| | | | |
|---|---|---|---|
| 1,330,581 | 2/1920 | Coulson | 317—230 |
| 1,729,429 | 9/1929 | Lundeen | 317—233 |
| 1,935,860 | 11/1933 | Robinson | 317—230 |
| 2,617,863 | 11/1952 | Stinson | 317—230 |
| 2,758,258 | 8/1956 | Bliss et al. | 317—230 |
| 2,936,514 | 5/1960 | Millard | 317—230 |
| 3,004,332 | 10/1961 | Werner | 317—230 X |
| 3,066,247 | 11/1962 | Robinson | 317—230 |

FOREIGN PATENTS 160,620   2/1954   Australia.

OTHER REFERENCES

Miyata: 362,878, May 18, 1943, application published by Alien Property Custodian.

JOHN W. HUCKERT, *Primary Examiner.*

SAMUEL BERNSTEIN, JAMES D. KALLAM, DAVID J. GALVIN, *Examiners.*